US008056920B2

(12) United States Patent
Knie et al.

(10) Patent No.: US 8,056,920 B2
(45) Date of Patent: Nov. 15, 2011

(54) COVER PANEL FOR A DRAWBAR-CONTROLLED GROUND CONVEYOR ON THE SIDE FACING THE DRAWBAR

(75) Inventors: Andreas Knie, Hamburg (DE); Markus Nagel, Hamburg (DE); Stefan Pfleger, Hamburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 1045 days.

(21) Appl. No.: 11/934,369

(22) Filed: Nov. 2, 2007

(65) Prior Publication Data

US 2008/0122253 A1 May 29, 2008

(30) Foreign Application Priority Data

Nov. 23, 2006 (DE) .................... 20 2006 017 805 U

(51) Int. Cl.
*B60D 1/60* (2006.01)
*A01B 33/00* (2006.01)

(52) U.S. Cl. ........................................ 280/507; 172/112

(58) Field of Classification Search .................. 280/507; 172/112; 111/66

See application file for complete search history.

(56) References Cited

U.S. PATENT DOCUMENTS

| | | | | |
|---|---|---|---|---|
| 2,587,142 | A * | 2/1952 | Gray et al. | 446/94 |
| 2,701,941 | A * | 2/1955 | Heth | 172/112 |
| 3,513,790 | A * | 5/1970 | Olsson | 111/186 |
| 3,589,459 | A * | 6/1971 | Harvey | 177/141 |
| 3,850,474 | A * | 11/1974 | Welch | 296/181.2 |
| 4,267,677 | A * | 5/1981 | Randolph et al. | 52/242 |
| 4,404,785 | A * | 9/1983 | McCracken et al. | 52/290 |
| 4,597,603 | A * | 7/1986 | Trabert | 296/193.1 |
| 4,757,868 | A * | 7/1988 | Cresswell | 180/11 |
| 6,886,872 | B2 * | 5/2005 | Matsumoto et al. | 293/115 |
| 7,665,777 | B2 * | 2/2010 | Mellis et al. | 293/102 |
| 7,937,858 | B2 * | 5/2011 | Roley | 37/412 |
| 2009/0109613 | A1 * | 4/2009 | Legen et al. | 361/679.54 |

* cited by examiner

*Primary Examiner* — Joanne Silbermann
*Assistant Examiner* — Daniel Yeagley
(74) *Attorney, Agent, or Firm* — Vidas, Arrett & Steinkraus, P.A.

(57) ABSTRACT

Cover panel for a drawbar-controlled ground conveyor on the side facing the drawbar, which has a mainly U-shaped skirt formed from a blank section in the lower area, with a bar section facing the drawbar and lateral leg sections, which covers a drive unit of the ground conveyor on the side and in the back and can be welded to a frame of the ground conveyor, wherein the upper edge of the skirt runs within the surface area of the skirt, an approximately middle upper section of the bar section is embossed with respect to the neighboring outer surfaces of the bar section, and the embossed section projects upwards into a centering section.

9 Claims, 3 Drawing Sheets

COVER PANEL FOR A DRAWBAR-CONTROLLED GROUND CONVEYOR ON THE SIDE FACING THE DRAWBAR

CROSS-REFERENCE TO RELATED APPLICATIONS

Not applicable.

STATEMENT REGARDING FEDERALLY SPONSORED RESEARCH

Not applicable.

BACKGROUND OF THE INVENTION

It is generally known in drawbar-controlled ground conveyors to cover the side of the ground conveyor facing the drawbar in the bottom area using a so-called skirt. The skirt is usually made of one single metal blank using pressing deformation and has a bar section and leg sections. The bar section is turned towards the drawbar side, while the leg sections partially and laterally cover the lower area of the ground conveyor. The drive unit, which is also controlled with the help of the drawbar, is normally located in the area covered by the skirt.

After the production of the approximately U-shaped skirt, it is welded onto the frame of the ground conveyor. This assembly procedure is relatively difficult if the skirt is produced with tolerances. Moreover, there is a risk that after pressing the skirt is deformed back into a shape that no longer matches the cover panel shape on the ground conveyor due to the inherent reset forces. It is thus necessary for the fitter to bend the skirt accordingly until it has the desired shape for welding.

As already mentioned, the skirt covers the drive unit. It thus needs to be as stable as possible. It is also known to flange both the upper and lower edges of the skirt in order to increase its rigidity.

In the shaping procedure in the press, it is important that the pre-shaped part or the blank is inserted in the press in the correct position so that the desired shape or the desired dimensions are achieved.

The object of the invention is to create a cover panel for a drawbar-controlled ground conveyor for the side facing the drawbar, the blank or preform of which can be easily centered and aligned in the pressing tool and which ensures effective protection of the drive unit from impacts without thereby increasing the linear dimension of the ground conveyor.

BRIEF SUMMARY OF THE INVENTION

In the case of the invention, the upper edge of the skirt is unprocessed and thus lies in the surface of the skirt. Through embossing, an approximately centered upper section of the bar section is embossed with respect to the neighboring outer surface of the bar section, and the embossed section projects upwards into a centering section.

The section of the bar section formed through embossing forms an effective protection of the drive unit from impacts without increasing the linear dimension of the ground conveyor. This occurs in that the area emerging from the surface progression of the skirt causes a seam-like stabilization. The centering section enables the insertion of the preform or the blank into the pressing tool in a reproducible manner.

In accordance with one embodiment of the invention, it is provided that the ledges formed between the embossed section and the neighboring outer surfaces of the bar section decrease in height from top to bottom and continuously cross over into the outer surface.

In accordance with another embodiment of the invention, the skirt has embossed sections in the lower area on both sides of a section with a hole, which run almost parallel to the bottom edge and into the leg sections. The progression of the outer surface of the embossed sections is almost parallel to the progression of the surfaces of the other outer side of the bar section. The depth of the embossed section can thereby decline continuously from top to bottom. This measure prevents the skirt from expanding again outwards after the pressing procedure and is thus easier to clamp into the welding devices for further processing. The middle area is excluded from the embossings in order to create the largest possible freedom of movement for the drive unit without increasing the linear dimension.

The lower embossings also offer effective protection from deformation due to impacts.

DETAILED DESCRIPTION OF THE INVENTION

Figure 1:
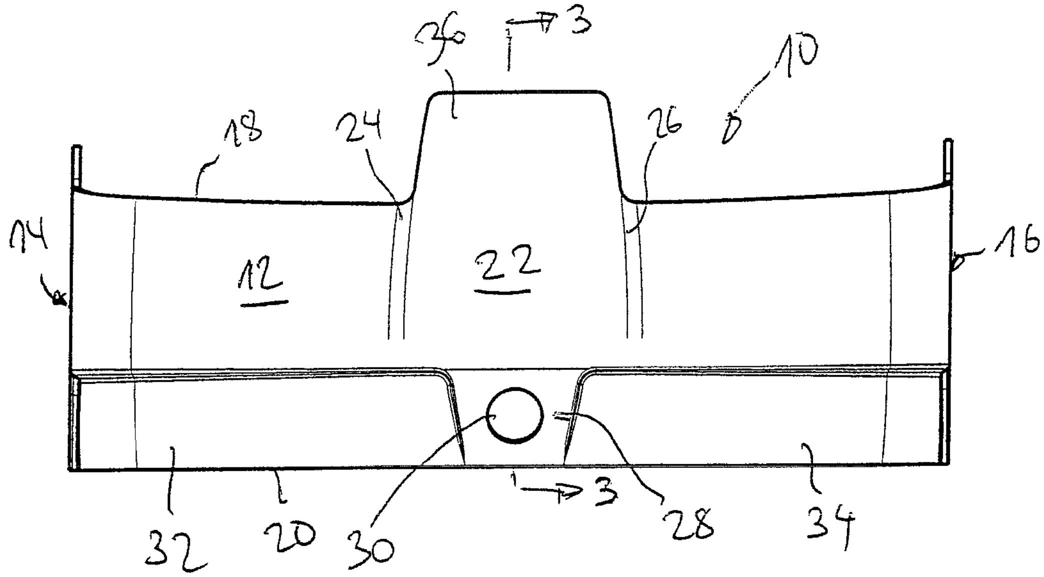
FIG. 1 shows the front view of a skirt for the cover panel according to the invention.

While this invention may be embodied in many different forms, there are described in detail herein a specific preferred embodiment of the invention. This description is an exemplification of the principles of the invention and is not intended to limit the invention to the particular embodiment illustrated One exemplary embodiment of the invention is explained below in greater detail using drawings The skirt 10 shown in FIGS. 1 through 5 is attached to the bottom side of the cover panel of a drawbar-controlled ground conveyor, namely in the area taken in by the drive unit A plurality of drawbar-controlled ground conveyors, for which the cover panel according to the invention is provided, is known. As is generally known, the drawbar serves to steer the drive wheel driven by a motor, which can be designed as a mono wheel or double wheel. For a cover panel, it is important that it does not just optically cover the drive unit, but also protects it from the outside against impacts and blows.

As with conventional skirts for such cover panels, the skirt 10 is also designed very generally in a U shape with a bar section 12 and leg sections 14, 16. The skirt 10 has an upper edge 18 and a lower edge 20, which lie in the surface area of the bar section 12 or the leg sections 14, 16, i.e. they are neither bent nor embossed.

Figure 2:
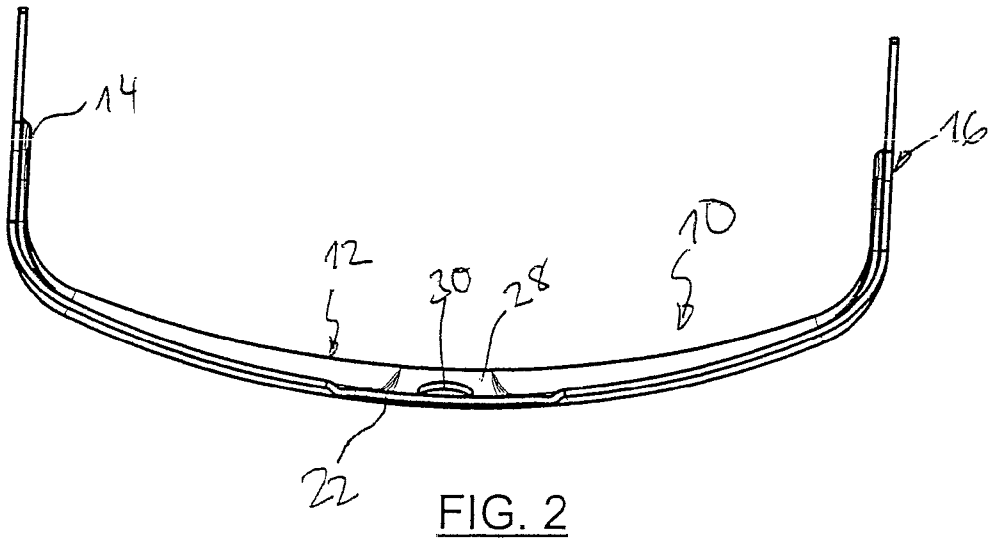
FIG. 2 shows a top view of the skirt according to FIG. 1.
Figure 5:
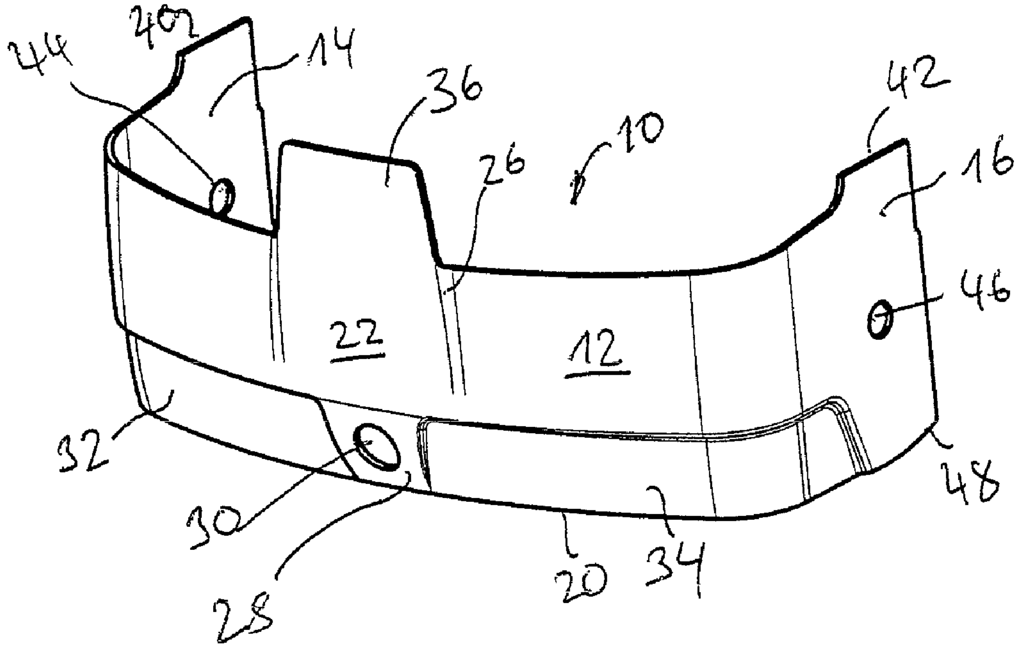
FIG. 5 shows a perspective view of the skirt according to FIG. 1.

As can be seen in particular from FIGS. 1, 2 and 5, the bar section 12 is bent slightly outward. A middle section 22 of the bar section 12 is embossed outwards through an embossing process. Ledges 24, 26, the height of which can continuously decrease downwards, are thereby formed on both sides of the middle upper section 22 (not shown here). In the lower area, the ledges 24, 26 gradually pass into the outer surface of the bar section 22. The embossed section 22 passes downwards with a slight curve into a middle section 28, in which a hole 30 is formed. The hole is for assembly purposes when the skirt is welded on.

Figure 3:
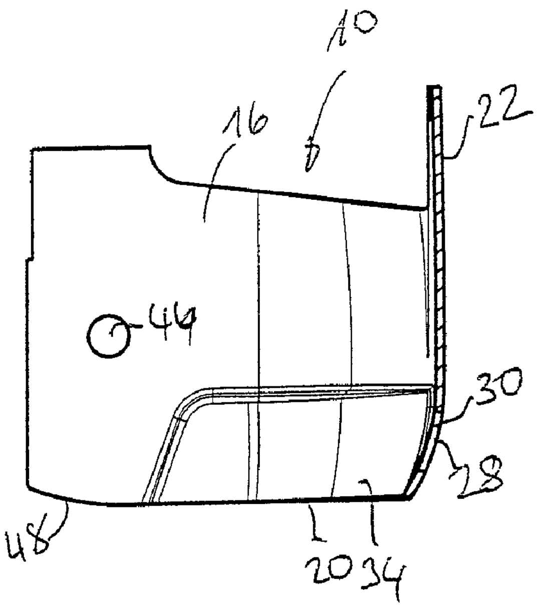
FIG. 3 shows a cut through the representation according to FIG. 1 along line 3-3.
Figure 4:
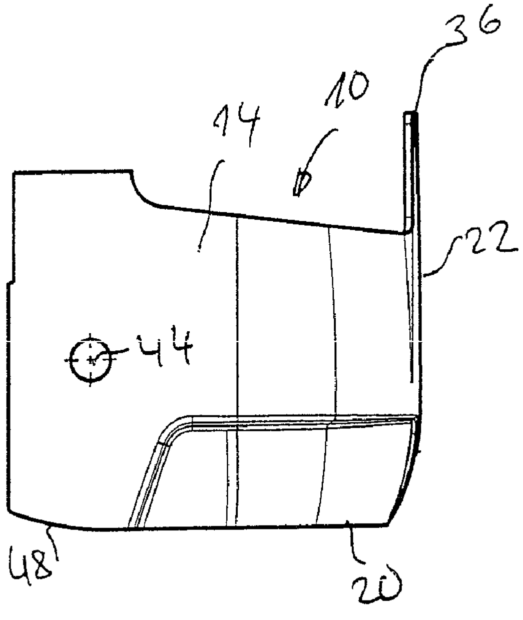
FIG. 4 shows the side view of the skirt according to FIG. 1.

Embossed sections 32, 34, which make up approximately one-third of the height of the bar section 12, are formed on both sides of the middle section 28 and extend to both sides of the middle section 28 into the leg sections 14, 16 (see FIGS. 3 through 5). Ledges, which become continuously smaller from top to bottom, are formed between the middle section 28, the width of which gradually decreases downwards, and the embossed sections 32, 34 or their outer surfaces.

As can be seen in the overall representation of the figures, the outer surface of the embossed sections 32, 34 runs approximately parallel to the outer surface of the bar section 12 or the leg sections 14, 16. The middle section 28 is somewhat more bent, as can be seen in FIG. 3. The depth of the embossed sections 32, 34 in the bar section 12 decreases from top to bottom. In the leg sections 14, 16, the depth is the same from top to bottom. The outer surface of the embossed section 22 over it extends mainly vertically. The embossed section 22 otherwise passes upwards and over into a centering section 36, which forms approximately a uniform trapezoid with a width that decreases upwards.

The lateral edges of the section 22 or 36 do not form a straight line, but are rather slightly convex and bent outwards.

The leg sections 14, 16 have upwards projecting ledges 40, 42 in the area of their free ends as well as a hole 44 or 46.

The skirt shown in FIGS. 1 through 5 is shaped from a flat blank, wherein the blank in the pressing tool can be positioned correctly by the centering section 36. The contour shown in the figures is worked out through pressing deformation in one single or multiple steps. It forms a stable protection of the drive unit, without needing to increase the overall length of the vehicle. The welding of the skirt 10 onto the frame of the ground conveyor (not shown) has proven to be easy and convenient, since the skirt 10 does not create reset forces based on its shaping after pressing.

It is also mentioned that the lower edge 20 of the free end has a section 48 that is rounded slightly upwards.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. Cover panel for a drawbar-controlled ground conveyor on the side facing the drawbar, which has a mainly U-shaped skirt formed from a blank section in the lower area, with a bar section facing the drawbar and lateral leg sections, which covers a drive unit of the ground conveyor on the side and in the back and can be welded to a frame of the ground conveyor, characterized in that an upper edge (18) of a skirt (10) runs within the surface area of the skirt (10), an approximately middle upper section (22) of a bar section (12) is embossed with respect to a neighboring outer surfaces of the bar section (12), and the embossed section (22) projects upwards into a centering section (36), wherein the lateral leg sections are raised on the free end by a ledge (40, 42) pointing upwards.

2. Cover panel according to claim 1, characterized in that between the embossed section (22) and the neighboring outer surfaces of the bar section (12) the height of the formed ledges (24, 26) gradually decreases starting from their upper edge (18) to the bottom and passes into the outer surface.

3. Cover panel according to claim 2, characterized in that the ledges (24, 26) extend downwards over one-fourth to one-third of the height of the bar section (12).

4. Cover panel according to claim 1, characterized in that the skirt (10) in the lower area on both sides of a middle section (28) of the lower area, with a hole (30) has embossed sections (32, 34), which run approximately parallel to a bottom edge (20) of the skirt (10) into leg sections (14, 16).

5. Cover panel according to claim 4, characterized in that the outside of the lower embossed sections (32, 34) runs approximately parallel to the outside of the upper sections of the skirt (10).

6. Cover panel according to claim 4, characterized in that the depth of the lower embossed sections (32, 34) in the bar section decreases continuously from top to bottom.

7. Cover panel according to claim 1, characterized in that the top view of the centering section (36) is approximately trapezoidal with a width that becomes smaller towards the upper end.

8. Cover panel according to claim 1, characterized in that the corners or edges of the centering section (36) and/or between the bar and leg sections (12, 14, 16) and/or the embossed and/or lowered sections have a rounded transition.

9. Cover panel for a drawbar-controlled ground conveyor on the side facing the drawbar, comprising:

a mainly U-shaped skirt, the skirt having an upper edge and a lower edge, the skirt also having a bar section and a lower area, the skirt further comprising lateral leg sections, the bar section facing the drawbar and the lateral leg sections covering a drive unit of the ground conveyor on the side and in the back and can be welded to a frame of the ground conveyor, wherein the upper edge of the skirt runs within the surface area of the skirt, the bar section further comprising an approximately middle upper section and a pair of neighboring outer surfaces, the middle upper section being embossed with respect to the neighboring outer surfaces of the bar section, and the embossed middle upper section projects upwards into a centering section, wherein the lateral leg sections are raised on the free end by a ledge pointing upwards.

* * * * *